United States Patent [19]

Krasberg

[11] Patent Number: 5,061,297
[45] Date of Patent: Oct. 29, 1991

[54] APPARATUS FOR AND METHOD OF PROVIDING IMPROVED GAS SEPARATION

[76] Inventor: Alan Krasberg, 100 Clement Dr., Burnt Chimney, Va. 24184

[21] Appl. No.: 466,409

[22] PCT Filed: Sep. 1, 1988

[86] PCT No.: PCT/GB88/00719

§ 371 Date: Apr. 2, 1990

§ 102(e) Date: Apr. 2, 1990

[87] PCT Pub. No.: WO89/01819

PCT Pub. Date: Mar. 9, 1989

[30] Foreign Application Priority Data

Sep. 1, 1987 [GB] United Kingdom ............... 8720560
May 17, 1988 [GB] United Kingdom ............... 8811660

[51] Int. Cl.$^5$ ............................................. B01D 53/22
[52] U.S. Cl. ............................................. 55/16; 55/68; 55/158
[58] Field of Search .................... 55/16, 68, 158

[56] References Cited

U.S. PATENT DOCUMENTS

| | | | |
|---|---|---|---|
| 2,734,592 | 2/1956 | Jones | 55/158 |
| 2,961,062 | 11/1960 | Hunter et al. | 55/158 |
| 3,144,313 | 8/1964 | Pfefferle | 55/158 X |
| 3,246,449 | 4/1966 | Stern et al. | 55/158 X |
| 3,397,790 | 8/1968 | Newby et al. | 55/158 X |
| 4,152,093 | 5/1979 | Germain | 55/158 X |
| 4,342,723 | 8/1982 | Sado et al. | 55/158 X |
| 4,367,135 | 1/1983 | Posey Jr. | 55/16 X |
| 4,397,661 | 8/1983 | King et al. | 55/158 |
| 4,427,424 | 1/1984 | Charpin et al. | 55/158 |
| 4,671,809 | 6/1987 | Taketomo et al. | 55/158 |
| 4,704,139 | 11/1987 | Yamamoto et al. | 55/158 X |
| 4,789,480 | 12/1988 | Bruschke | 55/158 X |

FOREIGN PATENT DOCUMENTS

| | | | |
|---|---|---|---|
| 0051469 | 5/1982 | European Pat. Off. | 55/16 |
| 2216009 | 8/1974 | France . | |
| 56-076212 | 6/1981 | Japan | 55/158 |
| 60-155504 | 8/1985 | Japan | 55/16 |
| 62-057630 | 3/1987 | Japan | 55/16 |
| 01-043330 | 2/1989 | Japan | 55/158 |
| 1095927 | 6/1984 | U.S.S.R. | 55/158 |
| 960712 | 6/1964 | United Kingdom | 55/158 |
| 972166 | 10/1964 | United Kingdom | 55/16 |
| 2022457 | 12/1979 | United Kingdom . | |

OTHER PUBLICATIONS

W. A. Bollinger et al., "Separation Techniques: Separation Systems for Oil Refining and Production", CEP Oct. 1982, pp. 27-32 (Copy in 55/158).
W. J. Schell et al., "Separation Techniques: Spiral-Wound Permeators for Purification and Recovery", CEP Oct. 1982, pp. 33-37 (Copy in 55/158).
"Chemical Engineering"; vol. 88, No. 14, July 13, 1981; pp. 63, 65 and 67.

Primary Examiner—Robert Spitzer
Attorney, Agent, or Firm—Bell, Seltzer, Park & Gibson

[57] ABSTRACT

A method of, and apparatus for, providing improved separation of gases in a gas mixture using particularly, but not exclusively, permeable membranes (28). In passing over a membrane (28), a portion of a gas mixture in intimate contact with the membrane wall experiences a change in density as components of the gas selectively diffuse through the membrane (28). In particular, the present invention uses gravity or other force to act on the density difference created by diffusion to assist in a) "peeling" (away from the wall) the gas which has already undergone substantial diffusion: b) keeping this gas away from the diffusion surface, once it has left; c) removing the gas from the membrane (28) more quickly; and d) slowing gas which has had less exposure to the diffusion process and moving it towards the membrane wall. Embodiments of the invention are described.

7 Claims, 6 Drawing Sheets

APPARATUS FOR AND METHOD OF PROVIDING IMPROVED GAS SEPARATION

The present invention relates to a method of, and apparatus for, providing improved separation of gases in a gas mixture using particularly, but not exclusively permeable membranes.

The membrane gas separation technique consists of passing a mixture of gases over a semi-permeable membrane with a pressure difference (or at least partial pressure difference) across the membrane. Gases with low diffusivity tend to stay on the high pressure side, while those with higher diffusivity tend to pass through. Diffusivity itself is a function of molecular size and solubility in the membrane.

Membranes are currently manufactured either as bundles of small diameter plastic tubing, or as spiral-wound plastic sheets sealed at three sides with a collecting tube in the middle, with spacers to hold the plastic apart. For the tubing, the high pressure side can be either the inside or the outside, depending on the manufacture.

The current method of using permeable membranes to separate gases has certain disadvantages. If the orientation of the element is chosen so the gas flow is horizontal, gas stratification can occur. Stratification may be best explained with reference to the following example which concerns the separation of a binary gas mixture such as helium and nitrogen.

In the boundary layer near the membrane wall the permeable gas, helium, diffuses through the membrane and leaves a layer of relatively dense nitrogen. This layer of nitrogen separates from the wall and falls through the lighter mixture, with little or no mixing, and "puddles" on the bottom of the membrane cylinder. If the gas velocity between the membrane surfaces is too low, the dense "puddle" will remain there, reducing the effective membrane area, and causing an area of high partial pressure of residual gas on the high pressure side of the membrane.

The current method of overcoming this separation problem is to increase the gas velocity between the membrane surfaces until the velocity is high enough to entrain the gas that tends to "puddle" on the bottom. Because there needs to be a flow of mixture to entrain the separated gas this implies that there will be a significant amount of permeable gas in the residual gas so that complete separation of the gases is restricted and is inefficient. Also special equipment is necessary to provide high flow rates which increases the cost and complexity of the gas separation procedure.

An object of the present invention is to provide an improved gas separation apparatus and method which obviates or mitigates at least one of the aforesaid disadvantages.

This is achieved by recognising and making use of the fact that in passing over a membrane, a portion of a gas mixture in intimate contact with the membrane wall experiences a change in density as components of the gas selectively diffuse through the membrane. When the density of the gas at the surface of the conduit is changed (via diffusion), the gas is subjected to a buoyancy-induced acceleration in the direction of flow, it forms coherent cells which peel away and interchange with cells of the adjoining gas, thus edging away from the membrane surface and out into the open space. Because of its density and the nature of laminar flow, gas already exposed to the membrane will end up in the centre away from the two membrane surfaces and will have the highest velocity in the stream. In particular, the present invention uses gravity to act on the density difference created by diffusion to assist in a) 'peeling' (away from the membrane wall) the gas which has already undergone substantial diffusion; b) keeping this gas away from the diffusion surface, once it has left; c) removing the gas from the membrane more quickly; and d) slowing gas which has had less exposure to the diffusion process and moving it toward the membrane wall.

In a preferred arrangement, the membrane element is mounted vertically. The direction of flow is oriented to use the effect of gravity on gases of different density and the velocity of gases is controlled to be sufficiently low to prevent or minimise entrainment of separated gases.

It is necessary to have knowledge of the relative permeability and density of the gases which it is desired to separate. When the membrane element is vertically oriented and if the less dense gas is the permeate, the gas mixture is passed down the membrane wall.

For example, where the binary gas mixture to be separated is helium and nitrogen in the boundary layer near the membrane wall the permeable gas, helium, will diffuse through the membrane and leave a layer of relatively dense nitrogen. This layer of nitrogen will separate from the wall and fall through the lighter mixture. As the dense nitrogen gas falls, the local gas mixture will recirculate upwards and replace the dense gas that has separated from the wall.

The gas velocity is controlled to be slow enough so that the dense gas can fall freely. The velocity of the dense gas downwards will be greater than the velocity of the gas mixture.

When the membrane is mounted vertically, with the 'dense gas' end at the bottom for the particular separation being undertaken (sometimes the gas will become less dense, sometimes more), the density gradient set up by the diffusion process will be stabilised. This arrangement does away with the need for high velocity entrainment preventing back-eddies of gas against the flow in vertical membranes, and gravity-assisted stratification and 'puddling' of gas in horizontal membranes.

In the laminar flow conditions that can exist in a membrane, the gas contiguous to the wall of the membrane is exposed to the osmotic process and undergoes a density change. Interior gas, on the other hand, does not. By buoyancy considerations the gas at the wall is then subject to a force tending to accelerate it towards the membrane exit (as it in turn is decelerating the gas next to it not contiguous to the membrane). For laminar flow of a uniform gas the velocity is zero at a surface and increases as one moves away. The more rapid gas thus accelerated will tend to move away from the walls (to be replaced by unexposed gas), and due to its higher velocity will also exit the membrane quicker providing a desired result.

According to a first aspect of the present invention there is provided a method of separating gases from a gas mixture using a gas membrane separator with a pressure difference across the membrane said method characterised by:

orienting the gas membrane separator so that the mixture travels in a direction substantially under gravity or other force field;

determining the relative densities and permeabilities of the gases:

injecting the gas mixture at the upper or lower end of the membrane separator subject to the result of the determination such that gravity or the force field has an effect on gases of different densities with at least one permeable gas diffusing through a membrane to become the permeate gas, and the residual gas after diffusion has taken place being moved towards a membrane separator exit by gravity or the other force field, and controlling the gas velocity through the separator on the inlet side of the membrane such that the gas velocity is sufficiently low to substantially prevent entrainment of separated gases.

Preferably, the gas membrane separator is substantially vertically oriented.

Conveniently the method also includes connecting a plurality of separating stages in series to separate gases from a mixture of a plurality of gases.

According to a second aspect of the invention there is provided apparatus for separating gases from a gas mixture, said apparatus characterised by gas membrane means disposed in an orientation so that gas passing through said membrane flows under gravity or other force field, means for providing a pressure difference across said membrane, a housing for surrounding said gas membrane means and having inlet means for permitting said mixture to be introduced to an upper or lower end of said apparatus depending on the relative permeablities and densities of the gas in the mixture, and outlet means for permitting separated gases to be removed and means for controlling the gas flow to substantially prevent entrainment of separate gases in the apparatus. Preferably, the apparatus and membrane are oriented so that the gas mixture flows in a substantially vertical direction under gravity or other force.

Conveniently, the membrane separator is a spirally wound sheet membrane with a gas permeate collecting tube in the centre thereof. Alternatively, the membrane separator is a hollow fibre membrane separator.

According to a third aspect of the present invention there is provided apparatus including a membrane separator element having a high pressure channel and a low pressure channel spirally wound together, said high pressure channel having located therein spacer means for defining a smooth substantially uninterrupted flow path along the active length of the membrane separator element within said high pressure spirally wound channel, said membrane separator element being characterised by said spacer means being a plurality of discrete longitudinal strips extending over the active length of the membrane separator element.

The spacer means can be rods provided only at the ends of the membrane separator element.

These and other aspects of the invention will be explained with reference to the accompanying drawings in which:

FIG. 6 is a diagrammatic representation of a second embodiment of a membrane separator according to the present invention.

Figure 1:
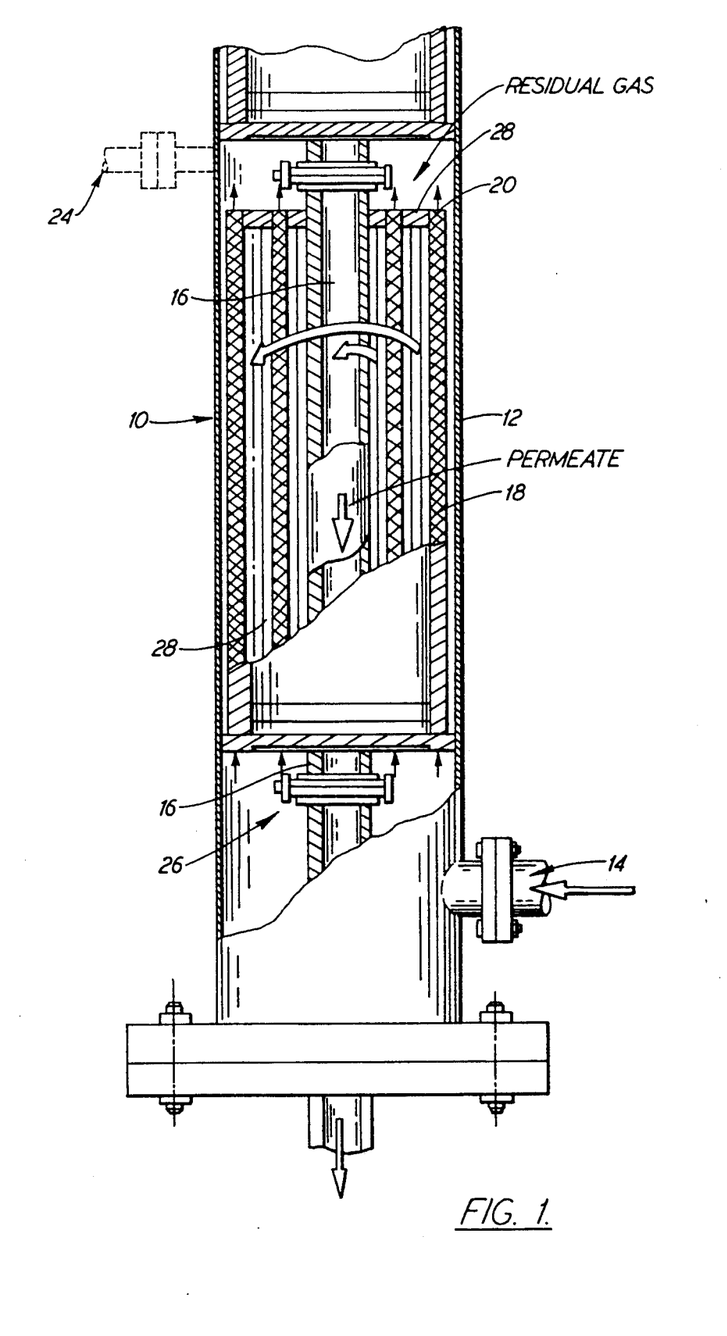
FIG. 1 is an elevated and partly broken away view of a spiral wound gas membrane separator for use in accordance with the method of the invention.

Reference is first made to FIG. 1 of the drawings which depicts a gas separation membrane element, generally indicated by reference numeral 10, of spiral wound construction is vertically orientable so that gas can be fed as shown at the bottom or it can be fed at the top depending on the density and diffusivity of the gases in the mixture as will be described in the examples given below.

The gas element 10 has a gas impermeable housing 12 having a gas feed port 14 at the bottom end. Through the centre of the element is a permeate tube 16 for collecting gas permeate and, spirally wound around the tube 16, is a cloth membrane separation element or spacer 18, best seen in FIG. 2, which separate the gas mixture into permeate gas which exits through permeate tube 16, and residual gas which exits from upper end 20 of the element 18. The construction of said membrane separation elements is known per se and will not be described in detail.

Figure 3:
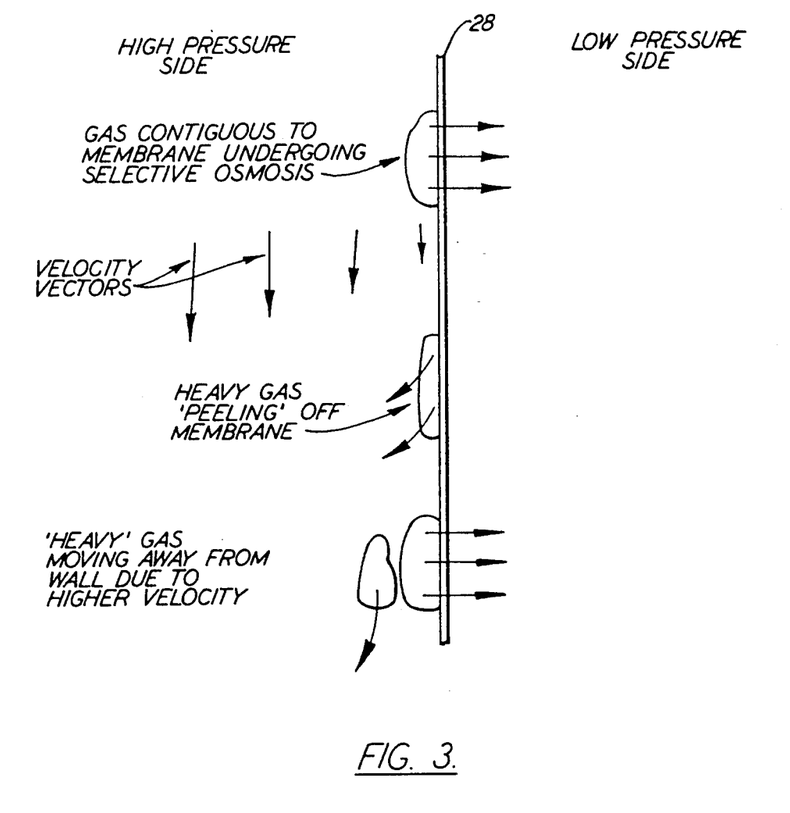
FIG. 3 depicts an enlarged diagrammatic view across a vertical membrane wall depicting changes in laminar flow of a gas mixture caused by local volume and density changes.

The gas separation operation will be best described with reference to FIG. 1 and FIG. 3 of the drawings. This example is for a gas mixture of helium and nitrogen which requires to be separated. In this case the inlet 24 is at the top (shown in broken outline) and the outlet is at the bottom 26 of the membrane element 18. Because the helium is lighter and is more permeable it diffuses across a cellulose acetate membrane 28 towards tube 16 by selective osmosis so that the heavy nitrogen gas remaining near the wall 'peels' off as shown and moves downward towards bottom exit 26 as shown. In the laminar flow conditions to be expected in a membrane, the gas contiguous to the wall of the membrane is exposed to the osmotic process and undergoes a density change. Interior gas, on the other hand, does not. By buoyancy considerations the gas at the membrane 28 is then subject to a force tending to accelerate it towards the membrane exit 26 (as it in turn is decelerating the gas next to it not contiguous to the membrane). For laminar flow of a uniform gas the velocity is zero at a surface and increases as one moves away. The more rapid gas thus accelerated will tend to move away from the walls (to be replaced by unexposed gas), and due to its higher velocity will also exit the membrane as desired.

To separate carbon dioxide from methane, the structure shown in FIG. 1 is used with the inlet 14 at the bottom and the exit at the top. In this case carbon dioxide is the denser gas but is also more permeable so that it is the permeate and the gas mixture decreases in density as it moves upwards past the membrane 28.

In another example to separate hydrogen from methane the inlet is at the top. For the separation of air into its constituents of principally oxygen and nitrogen, the oxygen is heavier and more permeable so that the inlet is at the bottom.

Also for mixtures of several gases, for example, methane, carbon dioxide, and hydrogen, positioning the inlet at the top or bottom depends solely on whether the mixture is going to end up heavier or lighter. It is possible to use a two-stage process such that the first stage would be one way and the second stage the other way around.

In the example and apparatus aforedescribed the buoyancy forces evolved can be sizeable. As a typical example, for helium separation from air at 100 bar (the conditions under which test were performed) gas enters the membrane at roughly 3% the density of water and exits at 12% with an exit velocity of only about 0.4 meter/min.

Even if turbulent or mixed flow exists, gravitational factors still aid the separation process as long as the gas is not completely mixed.

Figure 2:
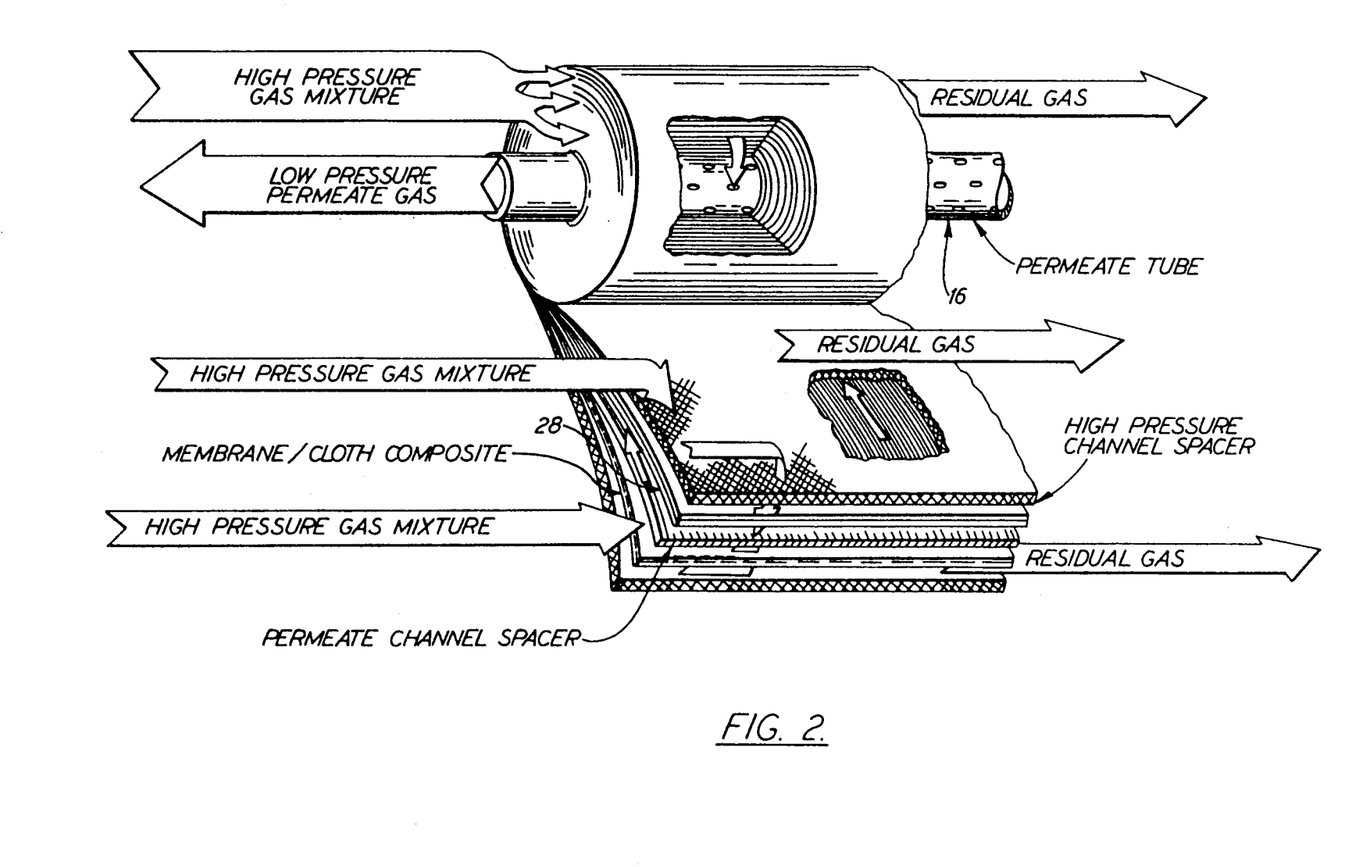
FIG. 2 is a perspective view of a partly unrolled spiral-wound element of the type shown in FIG. 1.
Figures 4A, 5A:
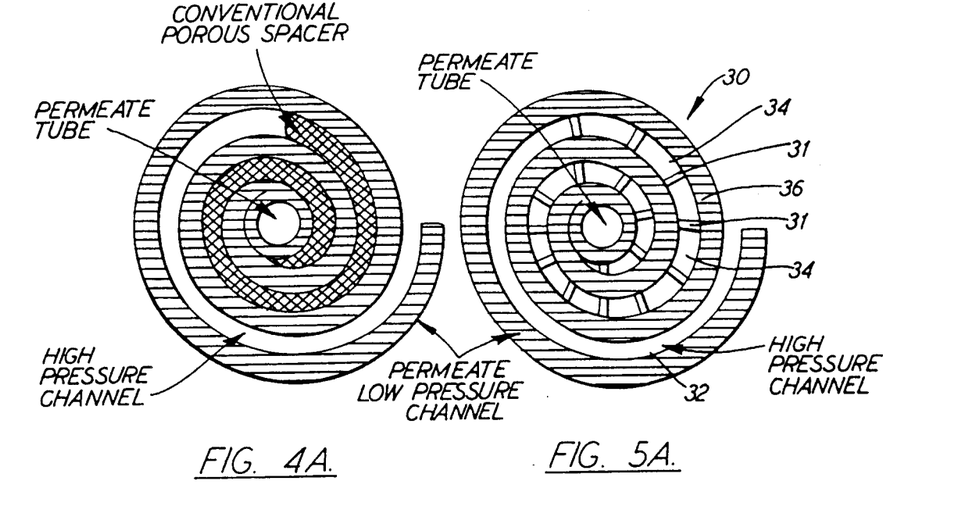
FIGS. 4A and 4B are top and side views of a prior art membrane separator as shown in FIG. 1.
FIGS. 5A and 5B are top and side views similar to FIGS. 4A and B of a first embodiment of a membrane separator, according to one aspect of the present invention.
Figures 4B, 5B:
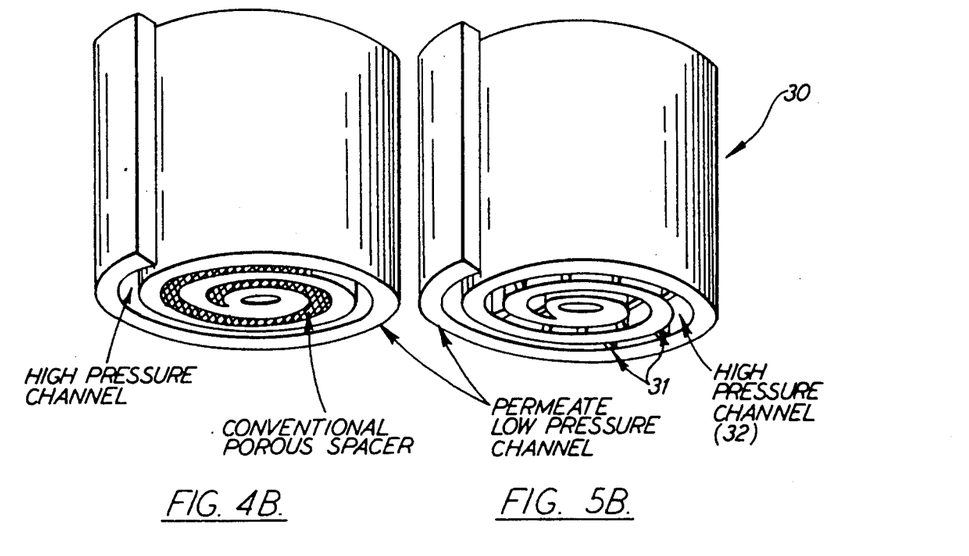

Reference is now made to the FIGS. 4A and 4B of the drawings showing membrane separators with conventional porous spacers as used in the embodiment shown in FIGS. 1 and 2. Such spacers tend to promote remixing of separator gas. Such remixing can provide a continuous density gradient along the element with minimal back-eddies, and reduces the efficiency of gas separation. FIGS. 5A and 5B show a first embodiment of a separator 30 similar to that in FIGS. 4A and 4B except that the conventional porous spacer has been replaced by a set of discrete longitudinal parallel plastic rods or strips, about ⅛ inch (3mm) in diameter indicated by reference numeral 31 disposed in high pressure channel 32. The strips 31 define separate gas channels 34 therebetween which extend the full length of the separator 30 as best seen in FIG. 5B.

With the longitudinal strips 31 the density layering set up by gravitational acceleration persists over the entire length of the separator 30, and the part of the gas that has the least amount of exchange through the membrane 36 is automatically brought into contact with the membrane 36 and the gas already exposed to the membrane kept away. In this way the gas separation is considerably enhanced.

Figure 6A:
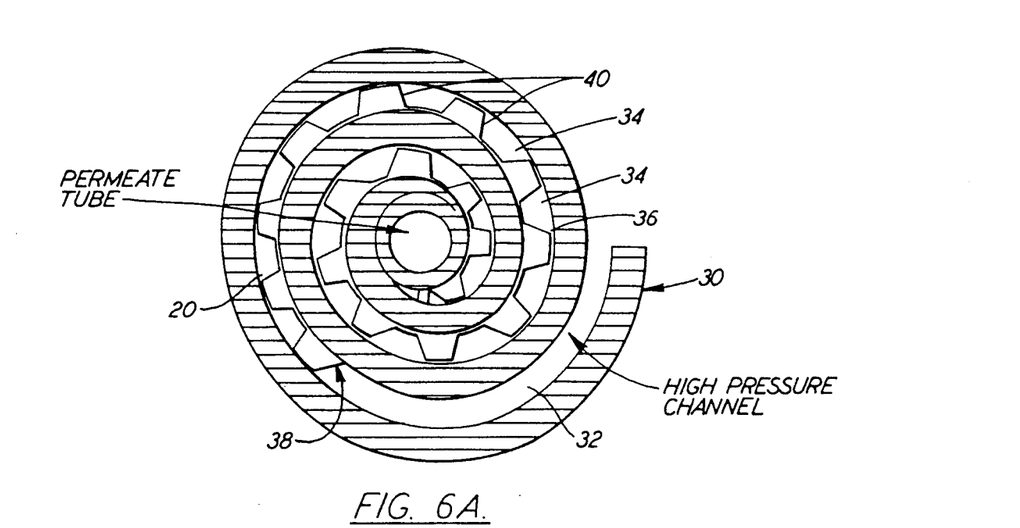
FIGS. 6A and 6B are views similar to FIGS. 5A and 5B, of a third embodiment of the membrane separator.
Figure 6B:
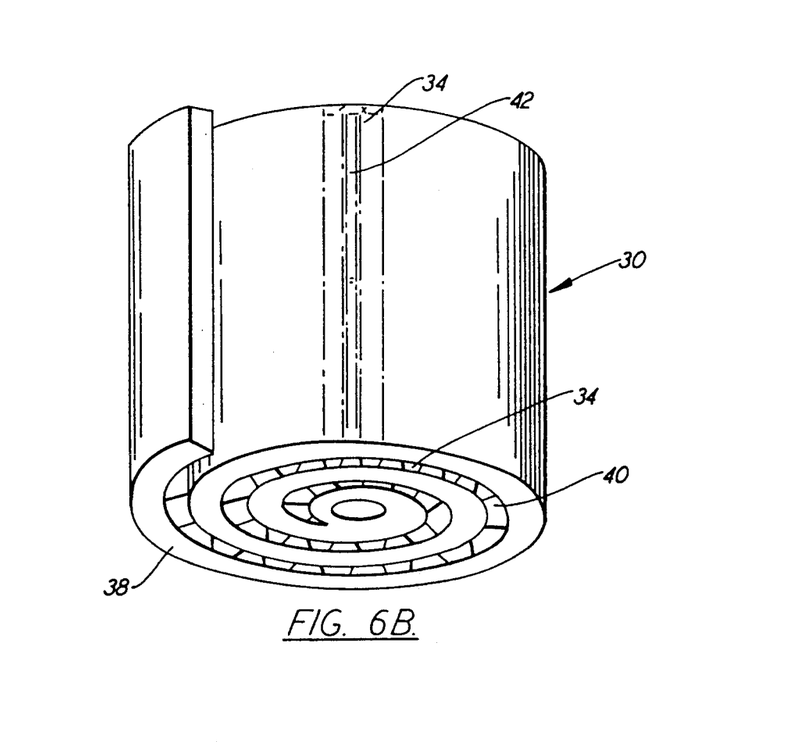
Figure 7:
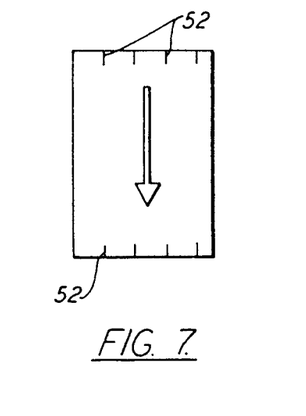
FIG. 7 depicts an elevated view alternative hollow fibre gas membrane separator which can be used in accordance with an embodiment of the invention.
Figure 8:
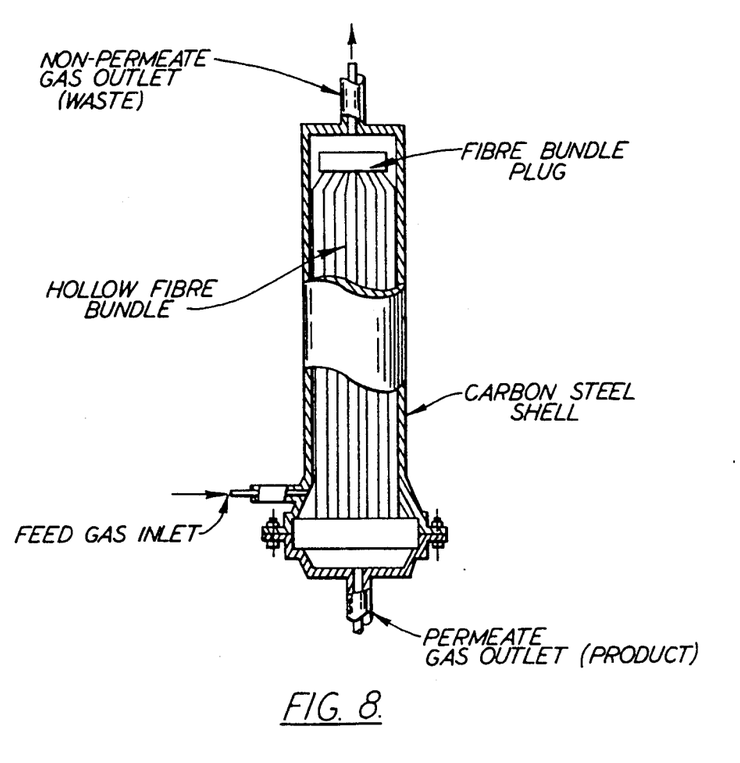

Reference is now made to FIG. 6 of the drawings which shows a diagrammatic representation of a further embodiment of the membrane separator element 50. In this case rods 52 act as spacers at the beginning (top) and end (bottom) of the element, however, over most of the membrane smooth uninterrupted flow is provided. Some turbulence occurs only at the top and bottom, but corners and crevices along the flow path which can impede the 'falling away' of the separated gas have been eliminated.

The principle advantage of the separators shown in FIGS. 5 and 6, is that gas separation is considerably enhanced over that achievable with separators shown in FIGS. 1-4.

It should be understood that various modifications may be made to the apparatus as aforedescribed without departing from the scope of the invention. For example, the invention has application to all other spiral-wound membranes, and to tubing membranes where gravity or some other force is controlling flow on the outside of the tubing, as seen in FIG. 6 and to hollow fibre membranes with interior flow. Separation could be achieved using another accelerative force such as that produced by a centrifuge for example. It should be understood that vertical separation does not depend on laminar flow but in horizontal separation, travelling away from the wall low velocity laminar flow conditions are required. Because of the small cross-sectional area of the tubing, laminar flow considerations, in particular, apply. Other effects could in this case make the technique important, such as differing permeation capabilities of different tubes causing variations of gas density at the same relative position and hence differentially varying the flow rate of gas, the time factor causing still more variation in density. Using gravity to help rather than hinder the flow tends to compensate for this. A very little change must be made to the construction of existing hollow-fibre membrane elements as the flow path is inherently smooth. They require to be correctly oriented and have the proper flow. It should also be understood that the structure disclosed works even if the high pressure channel spacers are of the wrong type because laminar flow-type separation is not necessarily involved.

The system can be used in a variety of applicatons particularly where substantial density changes take place, for example hydrogen-methane, helium-oxygen, $CO_2$-methane and especially where laminar flow is the norm. For example, in a gas chromatograph, use of a vertical sieve would result in sharper peaks and higher accuracy. In addition, the present system could be used in the separation of helium from natural gas which at present is carried out cryogenically, which is expensive. Also, the system could be used in the separation and purification of gases such as the noble gases such as Neon, Argon and Krypton.

There are a host of applications in the petrochemical industry, largely concerned with the removal of either hydrogen or $CO_2$ (and other acid gases) from gas streams. These include:

Removing and recirculating hydrogen in hydrocracker purge streams, Hydrotreater and Hydrorefining purge streams, Methanol and Hydrodealkylation purge streams, adjusting the hydrogen-CO levels in streams, treatment of sour gas to remove acid gases.

I claim:

1. A method of separating gases from a gas mixture using a gas membrane separator with a pressure difference across the membrane said method characterised by:

orienting the gas membrane separator substantially vertically and so that the mixture travels in a direction substantially under gravity;

determining the relative densities and permeabilities of the gases;

injecting the gas mixture at the upper or lower end of the membrane separator subject to the result of the determination as to whether the gas on the high pressure side will become more or less dense as a result of loss of more permeable component by diffusion, so that the densest gas in this stream will always be at the bottom, and controlling the gas velocity through the separator on the inlet side of the membrane such that the gas velocity is sufficiently low to maintain a substantially laminar flow along the surface of the membrane and to substantially prevent entrainment of separated gases.

2. A method of separating gases as claimed in claim 1 including connecting a plurality of separating stages in series to separate gases from a mixture of a plurality of gases.

3. Apparatus for separating gases from a gas mixture, said apparatus being characterised by gas membrane means disposed in a substantially vertical orientation so that gas passing through said membrane flows under gravity, means for providing a pressure difference across said membrane, a housing for surrounding said gas membrane means and having inlet means for permitting said mixture to be introduced to an end of said apparatus depending on the relative permeabilities and densities of the gas in the mixture, outlet means for permitting separated gas to be removed, and means for controlling the gas flow to permit substantially laminar flow and to substantially prevent entrainment of separate gases in the apparatus.

4. Apparatus for separating gases from a gas mixture as claimed in claim 3 wherein said membrane separator is a spirally-wound sheet membrane with a gas permeate collecting tube in the centre thereof.

5. Apparatus for separating gases from a gas mixture as claimed in claim 3 wherein said membrane separator is a hollow fibre membrane separator.

6. Apparatus as claimed in claim 3 including a membrane separator element having a high pressure channel and a low pressure channel spirally wound together, said high pressure channel having located therein spacer means for defining a smooth substantially uninterrupted flow path along the active length of the membrane separator element within said high pressure spirally wound channel, said membrane separator element being characterised by said spacer means being a plurality of discrete longitudinal strips extending over the active length of the membrane separator element.

7. Apparatus for separating gases from a gas mixture, said apparatus comprising gas membrane means disposed in an orientation so that gas passing through said membrane flows under gravity or other force field, means for providing a pressure difference across said membrane, a housing surrounding said gas membrane means and having inlet means for permitting said mixture to be introduced to an end of said apparatus depending on the relative permeabilities and densities of the gas in the mixture, outlet means for permitting separated gas to be removed, means for controlling the gas flow to substantially prevent entrainment of separate gases in the apparatus, and a membrane separator element having a high pressure channel and a low pressure channel spirally wound together, said high pressure channel having spacer means located therein for defining a smooth substantially uninterrupted flow path along the active length of the membrane separator element within said high pressure spirally wound channel, said spacer means comprising spacers positioned only at the ends of the membrane separator element.

* * * * *